Mar. 3, 1925.
H. J. SCHAFFER
CONTAINER
Filed Oct. 15, 1923
1,528,573
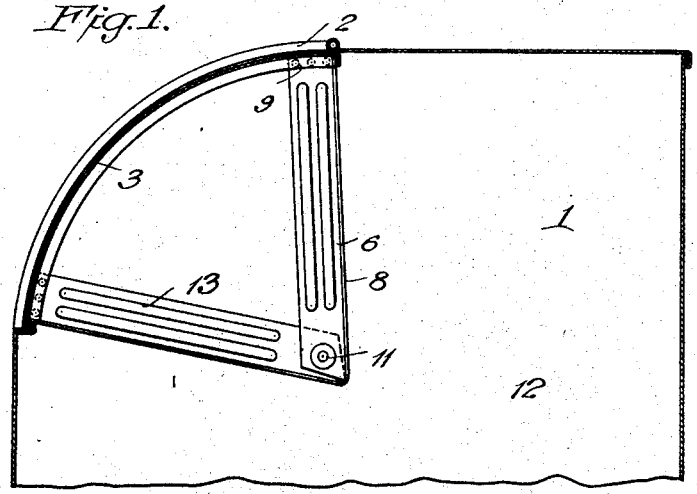
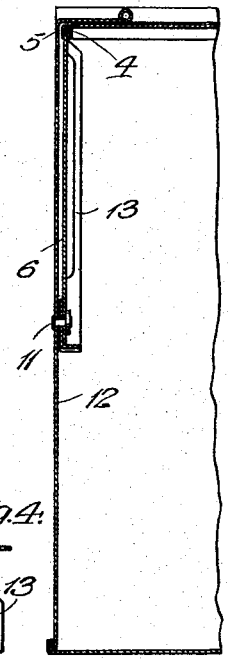
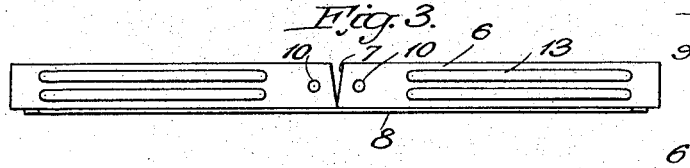
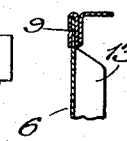
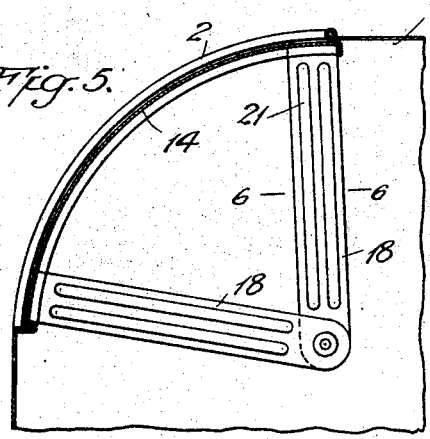
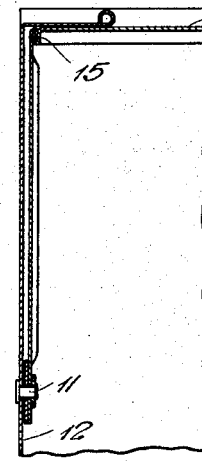
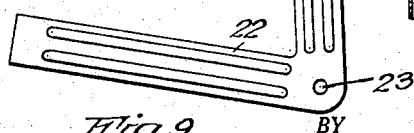
INVENTOR.
HENRY J. SCHAFFER
BY
ATTORNEYS

Patented Mar. 3, 1925.

1,528,573

UNITED STATES PATENT OFFICE.

HENRY J. SCHAFFER, OF BROOKLYN, NEW YORK, ASSIGNOR TO JACOB SCHAFFER, OF BROOKLYN, NEW YORK.

CONTAINER.

Application filed October 15, 1923. Serial No. 668,541.

*To all whom it may concern:*

Be it known that I, HENRY J. SCHAFFER, a citizen of the United States, residing at Brooklyn, in the county of Kings and State of New York, have invented certain new and useful Improvements in Containers, of which the following is a full, clear, and exact description.

This invention relates to containers such as bread and cake boxes and particularly to the sheet metal closures for the openings thereof. An object of the invention is to provide an improved and durable closure for such containers with which the weight will be lessened and the cost of manufacturing reduced, without materially decreasing the durability of the same. Other objects and advantages will be apparent from the following description of an embodiment of the invention and the novel features will be particularly pointed out hereinafter in claims.

In the accompanying drawing:

Fig. 1 is a sectional elevation of a portion of a bread box having a closure constructed in accordance with the invention;

Fig. 2 is another sectional elevation of the same;

Fig. 3 is a plan of one of the end supports for the closure member before it is attached to the member;

Fig. 4 is a fragmentary sectional elevation, on a larger scale, of the connection between the closure member and the end supports therefor;

Fig. 5 is a sectional elevation of a bread box having a closure device illustrating a different embodiment of the invention;

Fig. 6 is a sectional plan through one of the arms, the section being taken along the line 6—6 of Fig. 5;

Fig. 7 is another sectional elevation of the embodiment illustrated in Fig. 5;

Fig. 8 is a sectional elevation, on a larger scale, of the connection between the closure member and supporting arms of the embodiment illustrated in Figs. 5 and 7; and Fig. 9 is an elevation of an end support of the closure member illustrating a further embodiment thereof.

Referring particularly to Figures 1 to 4, a bread or cake box 1, or other suitable container, is provided with a doorway or opening 2, which it is desired to close. A closure member 3 having a shape and size which will close the opening 2 in the desired manner has its end edges turned or bent at an angle thereto as at 4, and then doubled back upon itself to the plane of the member, and then again doubled back upon itself a second time as at 5, so as to provide a groove between the flanges or walls formed by the first and second doublings of the turned over edge.

A strip of sheet metal 6 is stamped or otherwise formed into the shape illustrated in Figure 3, and midway of its ends the strip 6 is provided with a V-shaped notch 7 extending inwardly from one edge for a purpose to presently appear. The strip 6 is also provided along its edge opposite the notch with an angular flange 8 so that when the strip is bent at the apex of the V-shaped notch 7 into a form wherein the ends of the strip form a V the flange 8 will flex and form a continuous connection between the arms of the V at the apex. The free ends of the arms of the V-shaped end supports are inserted into the grooves formed at the ends of the closure member 3, and the doubled over portions and angular part 4 are compressed together over the inserted or embraced ends of the end supports so as to clamp the end supports to the closure member.

In order to more effectively secure or anchor the end supports to the closure member, the doubled edge sections of the closure member and the embraced ends of the end supports have complemental indentations 9 formed therein, such as by pricking indentations through one of the walls into another. These indentations provide a comparatively firm anchorage against removal of the end supports from the grooves. The indentations are clearly illustrated in Figures 1 and 4. The portions of each strip 6 adjacent the V-shaped notch 7 are provided with apertures 10 which will be brought into alignment with one another when the strip is bent into the V-shape and provide a common bearing for receiving the pivot pin 11 that passes through an end wall 12 of the container. The end supports thus serve as means for pivoting the closure member to the container in such a manner that when the member is oscillated about the pivot pins 11, it will uncover or close the door opening 2 of the container. In order to increase the rigidity of the arms of the support 6 against flexing in directions normal to their plane, the arms may be corrugated lengthwise as at 13.

In Figures 5 to 8 a modification of the invention is illustrated. The closure member 14 at its end edges is turned at an angle to the body of the member as at 15, and then doubled back once upon itself as at 16 slightly spaced from the first turned portion so as to form between the turned portions a groove 17. The end supports 18 are provided with a doubled back flange 19 which is adapted to enter or hook into the groove 17 as illustrated clearly in Figure 8. The arms 18 and the flanges 15 and 16 are then pressed together so as to firmly clamp the arms against removal from the groove 17. In order to more effectively anchor the arms to the closure member, the arms may be indented as at 20 into the doubled back flange 16 of the closure member and effectively anchor the arms to the member. The arms 18 may be separately stamped from sheet metal, and provided with lengthwise corrugations 21 for imparting rigidity against flexure in directions normal to their plane. The separate arms 18 may have suitable apertures which are aligned when the closure and end supports are assembled in the manner illustrated in Figure 5, the apertures receiving the pivot pin 11 of the container 12.

In Figure 9 the end supports 22 are formed of integral V-shaped stampings with a single aperture 23 for the reception of a pivot pin 11 of the container, and may also have the lengthwise corrugations 24 on the arms of the V in order to provide the necessary rigidity.

In accordance with this invention it will be obvious that the closure member may have its edges turned in order to provide a receiving groove along its end edges; and the end supports may be readily formed from strips of sheet metal which are scraps from the stampings of the major walls of the container. When the end support stampings are integral V-shaped pieces, such as illustrated in Figure 9, they will be made successively from the portion of the blank at the apex formed by the stamping therefrom of the preceding V-shaped support, so that there will be little or no waste of material. With the arms formed separately as in Figures 5 and 7, very small scrap pieces of sheet metal may be utilized for the formation of the end supports. In all of the embodiments, the substitution of V-shaped end supports in place of solid discs or sectors of metals heretofore commonly used, will result in the lightening of the weight of the complete container, and by reason of the use in their manufacture of scrap from the stampings of the major parts and the use of the mechanical manner of connection between the end supports and the closing manner, the cost of manufacture will be reduced.

It will be obvious that various changes in the details, herein described and illustrated for the purpose of explaining the nature of the invention, may be made by those skilled in the art within the principle and scope of the invention as expressed in the appended claims.

I claim;

1. A sheet metal closure for containers, comprising a sheet metal movable closure member with opposite edges bent at an angle to the body of the wall and then doubled upon themselves to provide flanges with relatively deep grooves, pivot arms of sheet material extending into the grooves of the flanges and serving as the support for the movable closure member, the sections of each doubled edge being compressed tightly upon the arms to clamp them within the grooves.

2. A sheet metal closure for containers, comprising a sheet metal movable closure member with opposite edges bent at an angle to the body of the wall and then doubled upon themselves to provide flanges with relatively deep grooves, pivot arms of sheet material extending into the grooves of the flanges and serving as the support for the movable closure member, the sections of each doubled edge being compressed tightly upon the arms to clamp them within the grooves, the doubled edge sections and the embraced ends of the arms having complemental indentations to securely anchor together the arms and closure member.

3. A sheet metal closure for containers comprising a sheet metal movable closure member with opposite edges doubled over to provide relatively deep grooves, pivot arms of sheet material extending into the grooves and serving as the support for the movable closure member, the doubled edges being compressed tightly upon the arms to clamp them within the grooves.

4. A sheet metal closure for containers comprising a sheet metal movable closure member with opposite edges doubled over to provide relatively deep grooves, pivot arms of sheet material extending into the grooves and serving as the support for the movable closure member, the doubled edges being compressed tightly upon the arms to clamp them within the grooves, the walls of the portion of the closure members forming the groove, and the embraced ends of the arms, having formed therein after assembly complemental indentations to securely anchor together the arms and closure member.

5. A sheet metal closure for containers comprising a closure member of the desired size and shape, and supporting arms of sheet material connected to spaced portions of the closure member along the same edge and converging to a common pivotal support, said arms being corrugated lengthwise to impart rigidity against flexure in directions normal to their faces.

6. A sheet metal closure for containers comprising a closure member of the desired size and shape and having grooves in the end portions thereof, and end supports for the closure member extending into said grooves and clamped therein by pressing together upon the embraced portions the end support the walls of the groove.

7. A sheet metal closure for containers comprising a closure member of the desired size and shape and having grooves in the end portions thereof, and end supports for the closure member extending into said grooves and clamped therein by pressing together upon the embraced portions of the end support the walls of the groove, the walls of the portions of the closure members forming the grooves and the embraced ends of the end supports having formed therein after assembly complemental indentations to securely anchor together the closure member and the end supports.

8. A sheet metal closure for containers comprising a closure member of the desired shape and size and formed of sheet material, and supporting arms of sheet material secured to spaced portions of the closure member along the same edge and converging to a common pivotal support.

9. A sheet metal closure for containers comprising a closure member of the desired shape and size and formed of sheet material, and supporting arms of sheet material mechanically interlocked with spaced portions of the closing member along the same edge and converging to a common pivotal support.

10. A sheet metal closure for containers comprising a closure member of the desired size and shape, and supporting arms of sheet material connected to spaced portions of the closure member along the same edge and converging to a common pivotal support, the cover between the points of attachment of the arms being stiffened to prevent flexure.

11. A sheet metal closure for containers comprising a closure member of the desired size and shape, and supporting arms of sheet material connected to spaced portions of the closure member along the same edge and converging to a common pivotal support, the cover being flanged between the points of attachment of the arms to prevent flexure.

In witness whereof, I hereunto subscribe my signature.

HENRY J. SCHAFFER.